July 19, 1932. W. V. VAN ETTEN 1,867,687
BALANCED POWER SCOOTER
Filed Sept. 13, 1930
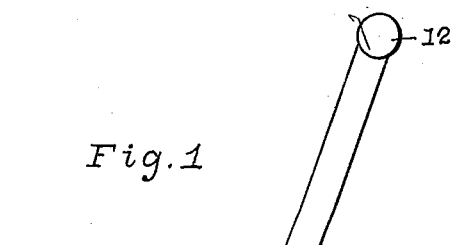
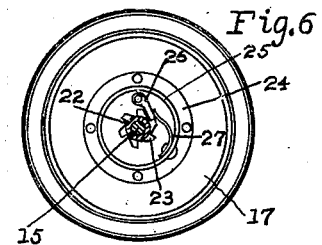
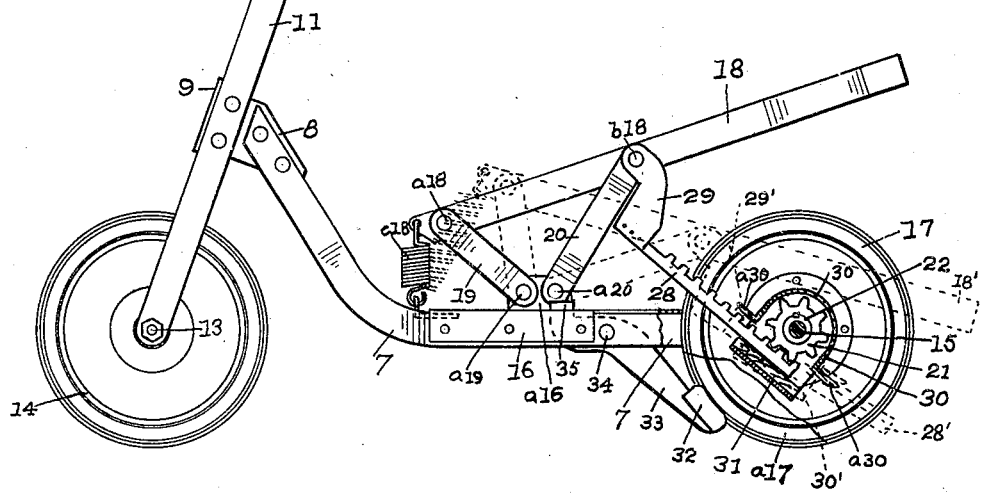
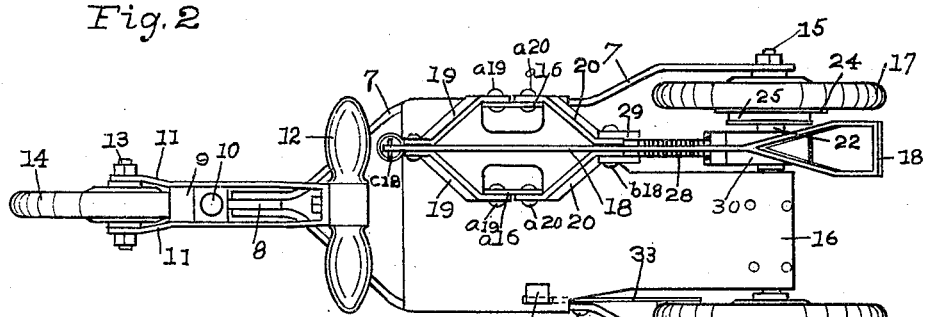
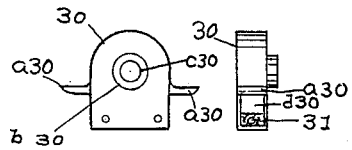
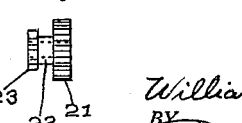
INVENTOR,
William V. Van Etten
BY David E. Lain,
ATTORNEY.

Patented July 19, 1932

1,867,687

UNITED STATES PATENT OFFICE

WILLIAM V. VAN ETTEN, OF BELLINGHAM, WASHINGTON

BALANCED POWER SCOOTER

Application filed September 13, 1930. Serial No. 481,667.

My invention relates to improvements in balanced power scooters and has for an object to provide a scooter drivable by foot-power mechanism having longer movements in oscillation than is usual.

Another object of my improvement is to provide more efficient foot-power mechanism for scooters than has been used hitherto.

Other objects of my improvement will appear as the description proceeds.

I attain these and other objects of my invention with the mechanism illustrated in the accompanying sheet of drawing forming a part of this specification in which Figure 1 is a side elevation of my new scooter, Fig. 2 is a plan view of Fig. 1, Fig. 3 is a side elevation of the combined pinion gear and ratchet wheel, Fig. 4 is a side elevation of the gear housing and rack guide, Fig. 5 is a front elevation of Fig. 4 and Fig. 6 is a rear elevation of the driving wheel with the ratchet wheel in place therein.

Similar characters of reference indicate similar parts throughout. Certain parts are broken away to show other parts hidden thereby.

With more particular reference to the designated parts: The machine frame consists principally of side bars 7, 7 which are spread apart in the main body of the machine and approach each other at the front end thereof where they are fastened to lug 8 of a head block eye which is pivotally joined with bracket 9 by pin 10. Bracket 9 is fastened to steering-wheel bars 11, 11 the upper ends of which are fastened to handle bar 12 and the lower ends engage front axle 13 on which is mounted front wheel 14 for revolution.

Rear axle 15 is engaged by the rear ends of frame bars 7, 7 and on the axle are mounted rear wheels $a17$ and 17 for revolution, the former of which is simply a vehicle wheel but the latter is the driving wheel. Bottom plate 16 is fastened on frame bars 7 and on rear axle 15. Pedal bar 18 extends the length of the bottom plate between the rear wheels adjacent the driving wheel and is fulcrumed on two pairs of links 19, 19 and 20, 20 to the upper ends of which it is pivoted by rivets $a18$ and $b18$. Two brackets $a16$, $a16$ are bent up from incisions made in plate 16 and to them are pivoted the lower ends of pairs of links 19, 19 and 20, 20 by rivets $a19$, $a19$ and $a20$, $a20$. Preferably, rivets $a19$ and $a20$ are close together while rivets $a18$ and $b18$ are farther apart as shown.

Coil spring $c18$ is engaged for tension between a hook fastened to the front end of plate 16 and in a hole in the front end of pedal bar 18 and tends to hold the front end of the pedal bar adjacent the plate with pair of links 19 inclined forward.

An assembly of spur gear 21 and ratchet wheel 23 is joined by sleeve 22 and mounted for revolution on rear axle 15 adjacent the driving wheel with the ratchet wheel in ratchet housing 25 which is fastened to plate 24 on the inside face of the wheel. Pawl 26 is pivoted to plate 24 within housing 25 and is engaged by ratchet 23 under the reaction of spring 27 fastened to the inner wall of housing 25. The ratchet and pawl are related to cause engagement therebetween only when the ratchet revolves to cause forward movement of the vehicle by driving wheel 17.

The forward end of rack 28 is fastened to shank 29 which is pivoted to pedal bar 18 by rivet $b18$ and the rear end thereof is extended through opening $d30$ in gear housing 30. The gear housing is mounted on axle 15 which is extended through hole $c30$ in one side thereof and on sleeve 22 which is extended through opening $b30$ in the other side thereof. This mounting of the gear housing allows freedom of oscillation thereof to accommodate the changing inclination of rack 28 as it passes forth and back through housing opening $d30$ in engagement with gear 21 from its full-line position at 28 to its dotted position at 28' with its upper end pivoted to pedal bar 18 by rivet $b18$ which oscillates in a curved line. the back of rack bar 28 slides on wooden block 31 fastened in the bottom of the housing and its teeth may bear on the bottoms of guide lugs $a30$, $a30$ extended from each edge of the housing above opening $d30$ therethrough. The construction provides for the retention of rack bar 28 in proper engagement with gear 21 as it reciprocates and oscillates beneath the same when driven by pedal bar 18 causing gear 21 and ratchet wheel 23 to revolve backward and forward respectively free from and engaged by pawl 26 as the rack returns from its lower position at 28' to its higher position at 28 and moves from said higher to said lower position; thus driving wheel 17 forward during each downward oscillation of the pedal bar and returning free from engagement with driving wheel 17 under the reaction of spring $c18$.

Brake block 32 is fastened on the lower end of brake lever 33 which is pivoted to left-hand frame bar 7 at 34 to dispose the brake block to bear on the tire of vehicle wheel $a17$ when the lower end of the lever is in its highest position in oscillation on said pivot. The upper end of the brake lever is fastened to pedal 35 which is extended from beneath bottom plate 16 through an opening therein and is disposed above the plate within easy reach of the rider's left foot. Pressure downward on pedal 35 causes brake block 32 to bear on the tire of wheel $a17$ to stop vehicle movement and when pressure is removed therefrom the brake block moves downward by gravity free from contact with the wheel.

In operation: The rider stands on the scooter with his left foot on bottom plate 16 and his right foot bearing on the rear end of pedal bar 18 and grasps handle bar 12 with his hands. Downward pressure on the pedal bar by his right foot will propel the car forward. Having completed a downward stroke with his right foot he raises the same and the pedal bar will follow his foot upward under the reaction of spring $c18$ which was extended by the downward movement of the rear end thereof. As stated, during the downward movement of the rear end of the pedal bar driving wheel 17 was engaged by the gear and was revolved forward thereby, but during the return, or upward, movement of the rear end of the pedal bar there is no engagement between the driving gear and the wheel 17 which is free to continue forward revolution during the return movement of the pedal bar. Repeated downward and return movements of the rear end of the pedal bar, under the urge of the driver's right foot, will continue to propel the vehicle forward while the same may be guided by the hands of the rider on handle bar 12. When desired, the rider may use his left foot to bear on brake pedal 35 and apply the brake to the vehicle.

The disclosed disposition of rack bar 28 beneath gear 21 allows of a greater movement thereof than is usual when the driving segment moves vertically alongside of the pinion gear. The disclosed dual fulcrum and link mounting of the pedal bar 18 provides an efficient mode of transferring the foot-pressure movements into the oscillatory reciprocation of the rack bar 28.

Gear housing 30 not only performs the described functions related thereto but also covers the pinion gear from exposure.

When the vehicle is moved backward on its wheels it is retained in a position with driving wheel 17 free from contact with the ground, the scooter running on wheels 14 and $a17$.

Having thus disclosed my invention, what I claim as new therein and desire to secure by Letters Patent is,—

1. In a scooter, a pedal bar having a fulcrum end and a pedal end, an end link pivoted to the fulcrum end of the pedal bar and to the scooter body, another link pivoted to the pedal bar distant from the end link and pivoted to the scooter body adjacent to the end link, and a tension spring connected to the fulcrum end of the pedal bar and to the scooter body.

2. In a scooter, a pedal bar having a fulcrum end and a pedal end, an end link pivoted to the fulcrum end of the pedal bar and to the scooter body, another link longer than the end link pivoted to the pedal bar distant from the end link and pivoted to the scooter body adjacent the end link, and a tension spring connected to the fulcrum end of the pedal bar and to the scooter body.

3. In a scooter, a pedal bar having a fulcrum end and a pedal end, an end pair of links pivoted together to the fulcrum end of the pedal bar and pivoted apart to the scooter body, another pair of links pivoted together to the pedal bar distant from the end links and pivoted apart to the scooter body adjacent the end links, and a tension spring connected to the fulcrum end of the pedal lever and to the scooter body.

4. In a scooter, a pedal bar having a fulcrum end and a pedal end, an end link pivoted to the fulcrum end of the pedal bar and to the scooter body, another link pivoted to the pedal bar distant from the end link and to the scooter body adjacent the end link, a tension spring connected to the fulcrum end of the pedal bar and to the scooter body, and a toothed-rack bar one end of which is pivoted to the pedal bar.

5. In a scooter, a pedal bar having a fulcrum end and a pedal end, an end link pivoted to the fulcrum end of the pedal bar and to the scooter body, another link pivoted to the pedal bar distant from the end link and to the scooter body adjacent the end link, a tension spring connected to the fulcrum end of the pedal bar and to the scooter body, and a bar having a toothed rack on one side thereof, one end of which is pivoted to the said pedal bar.

6. A driving gear assembly of a power scooter including a pedal bar having a fulcrum end and a pedal end, links pivoted at the fulcrum end of the pedal bar and to the scooter body to mount the pedal bar for oscillative reciprocation, a tension spring connecting the fulcrum end of the pedal bar with the scooter body, the rear axle of the scooter fastened to the body thereof, a pinion gear mounted on the rear axle for revolution, a driving wheel mounted on the rear axle for revolution, a toothed rack pivoted to the pedal bar extended in a slideway disposed beneath the pinion gear to engage therewith, said slideway adapted to guide the toothed rack in operative engagement with the pinion gear mounted on the rear axle for oscillation, and means to engage the pinion gear with the driving wheel for forward driving of the wheel only.

WILLIAM V. VAN ETTEN.